Figure 1:
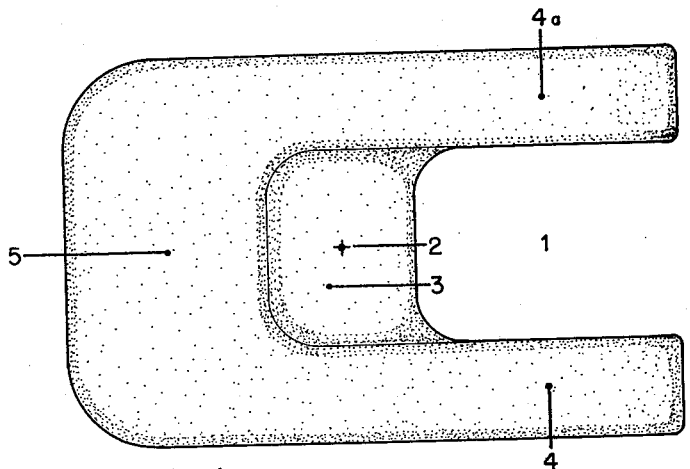

Dec. 11, 1962   W. O. DYSARD ETAL   3,067,441
ONE-MAN FOOT-PROPELLED WATER FLOAT
Filed Feb. 23, 1960

William O. Dysard
INVENTORS

United States Patent Office 3,067,441
Patented Dec. 11, 1962

3,067,441
ONE-MAN FOOT-PROPELLED WATER FLOAT
William O. Dysard, 4638 Newcome, San Antonio, Tex., and Rex L. Reitz, 2204 McCullough, Austin, Tex.
Filed Feb. 23, 1960, Ser. No. 10,315
3 Claims. (Cl. 9—347)

Our invention relates to design of a one-man, foot-propelled, water float.

One of the objects of our invention is to produce in one integral unit a rigid-type, one-man, lightweight water float having unique qualities of flotation and maneuverability and the stability that is customarily found only in much larger and heavier craft.

A further object is to build a one-man, single-unit float of a design that will permit propulsion and maneuverability to be effected exclusively by the lower limbs and feet with an advantage thus accruing to the operator of having his hands and arms freed for other occupations. Further advantages of quietness, increased propulsive power and a slower fatigue rate are inherent in the use of the legs rather than the arms to effect propulsion.

Another object is to so locate the weight of the operator and to so position the lower limbs that an extreme degree of maneuverability will be achieved. In this latter object, we sought to approach as nearly as possible the ideal condition for maximum maneuverability which is that of locating all weight precisely at the center of gravity with the application of the maneuvering forces to be applied about a vertical line extending precisely through that point. The application of a moment about this vertical line results in a spinning top effect and it was this ultimate possibility which we sought to approach.

A further object was to design a compact, lightweight, highly portable float that could be transported in the trunk of many cars, one that required no dismantling and could be launched anywhere in a few seconds of time and which would yet be stable enough and of a design that would permit boarding even in deep water with no serious threat to stability.

Other objects and advantages of the invention will be apparent from the description and claims.

It is a well known fact that different materials exhibit different specific gravities and weights and that any material having a lesser weight by volume than water will float in that medium. It is also a well known physical law that the buoyant force acting upon an object submerged in water is equal to the weight of the water displaced. The practical significance of this principle is that an object weighing less than the water which it displaces will float and a portion of the object will remain above the water level. It has also been amply demonstrated that such a floating object can support upon or within its borders additional weight before its total displacement is exceeded. Further, some objects are of such low density or light weight that only a very minor percentage of their total displacement is needed to support them and these objects ride very high in the water and barely indent its surface.

One such material is expandable polystyrene, a material which can be molded or fused into blocks having a density as low as one pound per cubic foot. In the lower density ranges, this solid material exhibits a high degree of floating capacity.

It is another well known physical law that every action produces an equal and opposite reaction. One of the applications of this principle in the field of floating objects results in what is known as propulsion. Propulsion results from the reaction which occurs when a force of any nature of magnitude involving a horizontal component is applied from object to water. The law operates irrespective of the method of application which may be by propeller, oar, paddle, or such agents as the human hands and feet. Likewise, the law operates irrespective of the direction of application which gives rise to the possibility of varying the direction of propulsion by varying the direction of application. The efficiency in terms of propulsion which results from the application of a propulsive force is dependent upon the magnitude of the counter forces involved. Counter forces arise through that property of the object known as inertia and also through the inertia of an indeterminate quantity of water which is shoved aside or otherwise displaced by the passage. Air friction may also impose a loss in propulsive efficiency.

It is generally known that propulsion efficiency is improved when a propelled craft is pursuing a straight-line course and avoiding all skidding, either on the part of the craft proper or on the part of any vanes or rudders which may be utilized to achieve steerage. The angular deflection which is achieved by the use of vanes or rudders is accompanied by a loss in efficiency due to the displacement of additional quantities of water. Craft can be maneuvered by the use of vanes or rudders, but only at the price of lowered efficiency and only if sufficient speed is maintained to provide steerageway. A motionless craft cannot be rotated in position by the use of vanes, rudders or other deflectors. Only the application of a moment about the craft's center of gravity can achieve this maneuver. Likewise, if the direction of the moment can be changed at will, the craft can be made to rotate first in a clockwise and then in a counterclockwise direction. Further, if a flexible range of forces varying widely from circular to linear can be applied about or around the center of gravity, a very wide range of maneuvers become achievable.

The foregoing substantially sets forth the state of the art insofar as the pertinent factors relate to the subject matter of this invention which will now be described.

The material of this float is expandable polystyrene, molded or fused in the lower density ranges where the buoyant force exceeds the weight by an extremely wide margin. This material can be molded into blocks by processes well understood by persons knowledgeable in this field. Essentially, the process involves the introduction of steam in a given temperature and pressure range into a mold containing polystyrene pellets. These pellets expand when heated and, being confined under pressure to the cavity area, fuse into a solid block of substantially uniform density. The mold shape and size can be varied widely and a wide range of features can be made an integral part of the molded object. One such object is the subject matter of this invention and is represented by FIGURE 1. It should be noted, however, that this float can be shaped from a block of this material as well as molded if suitable shaping tools and the requisite skills are available. The characteristics of the finished float constitute the subject matter of this invention and no claims will be made in respect to already well known molding and carving techniques.

Figure 2:
Figure 3:
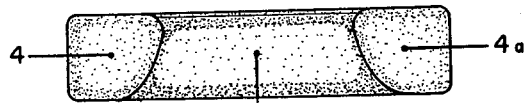
Figure 4:
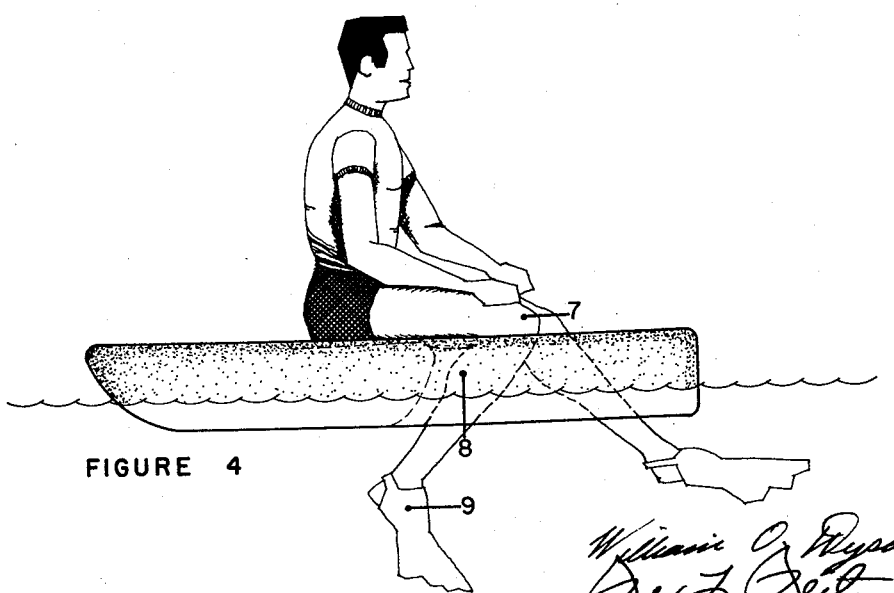

FIG. 1 is a plan view of float device from above;
FIG. 2 is a side view of float device shown in FIG. 1;
FIG. 3 is a rear view of float device showing the portion of material indicated by 4—4a in FIG. 1; and
FIG. 4 is a perspective water-level view of float device embodying our invention in use.

Referring now to these drawings, FIG. 1 is the preferred embodiment of a float device formed into a block and composed preferably of polystyrene material. Said block is preferably formed with an opening or corridor 1 extending inward from one end to near the geometric center of the block. Contiguous to the rear extremity of the corridor thus opened is preferably formed a seating area 3 on the top or upper surface of said block. Said seat 3 is preferably formed directly over the center of gravity 2. Buoyant material 4—4a forms the walls contiguous to the corridor and 5 indicates deck space behind seating area 3. Underside of block is preferably curved or sloped at the extremity opposite corridor 1. Said curvature 6 comprises the bow of float device and increases propulsion efficiency.

FIG. 3 indicates the manner in which all direct contact surfaces contiguous to corridor 1 are preferably rounded to reduce abrasion and to allow maximum lateral movement of the lower limbs.

Seat 3, being contiguous to the deepest extremity of corridor 1, is readily accessible through the entrance thus provided. Also, being contiguous to the commodious corridor, seating area 3 provides means for supporting the user well above the surface of water while at the same time allowing the lower limbs and feet to dangle naturally through corridor into water. Thighs and knees 7 preferably lie at rest along upper surface with calves 8 and feet 9 making a penetration of the water. Feet 9 are preferably equipped with fin attachments as an aid to more efficient propulsion. Propulsion and maneuver is effected by freely manipulating the feet 9 in the commodious area substantially under the geometric center of the float device.

FIGURE 1 represents the top view of a polystyrene float whose generally rectangular dimensions are approximately 36 inches by 58 inches and whose thickness is approximately 8 inches. The float weighs approximately 18 pounds. It is designed to accommodate one occupant in the weight range of 100–250 pounds. The dimensions of this float can be varied in proportion within limits without destroying its essential characteristics, providing the load is varied accordingly.

It will be noted in FIGURE 1 that the perimeter of the float has been heavily indented by a large U-shaped cut 1, extending inward from one face. This material is removed and is approximately 18 inches in width by 23 inches in depth. The purpose of the corridor thus opened is to permit direct access to the central region of the float before it is burdened or loaded.

Point 2 represents a location directly over the float's center of gravity. Area 3 represents a portion of deck space about the center of gravity which would be occupied by a seated operator. Point 4 represents area contiguous to the corridor, and 5 is the unbroken deck space beyond the seating area.

FIGURE 2 is a side view of the float. It will be noted that one end of the float has been given a pronounced slope 6. This is the bow of the float and this curvature enables the craft to breast the water more efficiently. Also, being at the opposite extremity, this removed material compensates in large part for the material removed at the access corridor, thus restoring balance and all but eliminating the center-of-gravity shift which would otherwise occur.

FIGURE 4 is a reproduction of FIGURE 2 showing, however, in outline, the positioning of the operator's legs with artificial fin extensions. Points 7, 8, and 9 represent the thighs, calves and webbed feet of the operator in that order. It will be noted that the body line of the seated operator is not broken by ninety degrees at the hips and that the thighs slope downward somewhat. This is made possible by giving a well-rounded turn to the edges of the corridor, both top and bottom, thus allowing the operator's knees to drop somewhat and allowing the feet to swing back under the center of the craft. All other edges of the craft are rounded to improve appearance and to reduce abrasion.

Having thus described the physical attributes of the float, the unique functions inherent in this design will now be described.

The float is not mounted or boarded in any customary meaning of those terms. The operator simply walks or wades directly into the heart of the craft and seats himself in area 3 facing the open end of the cut-out portion 1. Reflection will reveal that, in assuming an upright sitting posture, the legs are bent at both the knees and the hips so that the principal weight of a seated person comes to rest on the hips well back of where the feet are planted. Corridor depth calculations considered this fact and insure that the operator's weight will come to rest in an area directly over the craft's center of gravity. The craft is loaded from deep inside its own perimeter and no weight is transferred across its outer surfaces. Virtually all the tilting or dipping which customarily attends small craft boarding is thus eliminated. Since all weight is deposited directly on the center-of-gravity area, the float sinks uniformly to the required displacement. The float is trim and level before, during and after loading. This float sits very lightly upon the water and will draw 3½ to 4 inches of water with a 185-pound operator aboard. The unique stability of this above-water float derives partly from the fact that nearly 50% of its total exposed surface area is in contact with the water. Likewise, its broad flat bottom spreads the buoyancy in nearly all directions from the centrally positioned operator. The customary top-heaviness which would ordinarily prevent the use of a craft of this size is almost completely counterbalanced by a vertical bracing effect growing out of the operator's position. Though his weight is supported above water level, the operator's limbs reach beneath the craft and make a substantial penetration of the water. This contact in a vertical direction with a denser medium near the center of gravity has a strong stabilizing effect. It should be noted that the craft is not hydrodynamically complete without an operator. The craft is specifically designed to accommodate one operator within height and weight limitations located in one specific area within its borders. The operator complements the craft and completes its functional characteristics. It is much more stable with an operator aboard than when unoccupied.

The craft is propelled by a back-and-forth motion of the lower limbs. The feet are equipped with artifical fin extensions. The motion is consistent with the natural bending tendencies of the human ankles. Force is exerted by pointing the toe downward and then thrusting forward with the full surface of the fin against the water. The return is accomplished by bending the ankle to bring the fin to a horizontal position to reduce drag and then swinging the foot back toward and under the operator. The full power of the legs is thus brought to bear with high efficiency. The direction of movement is opposite to that in which the operator faces.

It will be noted from FIGURE 4 that the feet are in a position substantially under the center of gravity. The aperture through which the lower limbs dangle is sufficiently commodious to allow the freest play of the webbed feet. The operator does not straddle anything and occupies a completely free and natural position. A wide range of foot movement is possible including circular sweeps in either direction. The flexibility of the lower human limbs is such that on circular swings the feet can be manipulated so as to apply force through the entire circular sweep. The feet 9 are in communication with the center-of-gravity area 3, through the agency of the lower limbs 7 and 8. Moment is thus applied substantially around a vertical line through the center of gravity and effectuates rotary movement of the craft with a high degree of efficiency. The force is direct and immediate and, being originated under the center of the craft, the application has no adverse effect upon stability. Consequently, the responsiveness is of a very high order. From a stationary position the craft can be spun 360 degrees in five seconds of time. Likewise, from a stationary position it can be rotated 45 degrees and returned to the original position in three seconds. The craft responds with high efficiency and fidelity to the slightest movement of either of the operator's feet. The response is so effortless that the operator will seldom twist the torso or even the head to achieve a new facing but will achieve it with a slight motion of the foot. A wide range of facings and position changes are thus achievable with very modest effort. Positional flexibility is of a very high order. In addition to spinning and turning, the craft executes a wide range of other maneuvers with equal facility. On typical water it will cover two miles in one afternoon with only moderate effort required from the operator.

Another unique feature is that which affords the operator a ready means of access to the water for swimming, under water exploration or other purposes. Since he sits at the deepest extremity of the access corridor, he need only swing his body forward a few inches to drop through the aperture. The aperture is sufficiently commodious to permit his exit and since his weight need shift only slightly from the center-of-gravity area, only minor tilting accompanies his departure. Likewise, the central loading permitted by the access corridor allows his safe return to the craft irrespective of water depth. On the return he will either emerge through the aperture from directly beneath the craft or swim into the corridor from the open end. He will then position himself at the back of the corridor facing the open end preparatory to mounting. To mount, he places the palms of his hands on the deck surface, in area 4, to either side of the corridor and then hoists his body up and back to slide easily into the seating area As in departing, the palms, which briefly support his weight, are placed sufficiently near the central area of the craft to allow it to remain substantially in balance. Full balance is restored as soon as the seated position is resumed. The departure from and the return to the craft can be accomplished without any weight being transferred across the outer edges of the craft. The danger of capsizing, which would accompany any effort to mount a craft of this size from over the sides, is eliminated.

For some specialized uses, certain of these dimensions can be varied within narrow limits to advantage. For use in underwater exploration, for example, where the operator would normally mount and dismount repeatedly, the craft would benefit modestly from a slight deepening and widening of the access corridor. This is due to the fact that weight is shifted briefly to the palms of the operator's hands and to the further need of the operator to drop through the craft. These special variations would only serve further the ends pursued throughout the craft's design. This design implements two objective principles which might be called the "central access principle" and the "constant balance principle." In pursuit of these ends, access is provided to the center of the craft and buoyancy is spread as evenly as possible outward in all directions from the center-of-gravity area.

Further modifications will be apparent to those skilled in the art and it is desired, therefore, that the invention be limited only by the scope of the appended claims.

Having thus described our invention, what we claim and desire to secure by Letters Patent is:

1. A water float comprising a one-piece rigid body having top and bottom surfaces which are parallel and planar, said surfaces, in plan view, being generally rectangular, a corridor large enough to freely permit a person to enter therein, said corridor extending from one end of the body, where said corridor is open, inwardly to near the geometric center of the body, there being a seat on said top surface adjacent the inner end of the corridor, the seat being over the center of gravity of the body, whereby the weight of an operator seated upon the seat with his lower limbs dangling through the corridor will be located at said center of gravity.

2. A water float as defined in claim 1, the other end of said body being the bow and being provided with a curved lower surface compensating in part for the material removed by the formation of the corridor.

3. A water float as defined in claim 2, wherein the edges of the corridor are well-rounded allowing the knees of the operator to drop somewhat and allowing the operator's feet to swing back under the geometric center of the float.

References Cited in the file of this patent

UNITED STATES PATENTS

| | | |
|---|---|---|
| D. 160,712 | Chapman | Oct. 31, 1950 |
| 1,465,790 | Ranlett | Aug. 21, 1923 |
| 2,802,222 | Chapman | Aug. 13, 1957 |

FOREIGN PATENTS

| | | |
|---|---|---|
| 1,029,133 | France | Mar. 4, 1953 |